Figure 6:
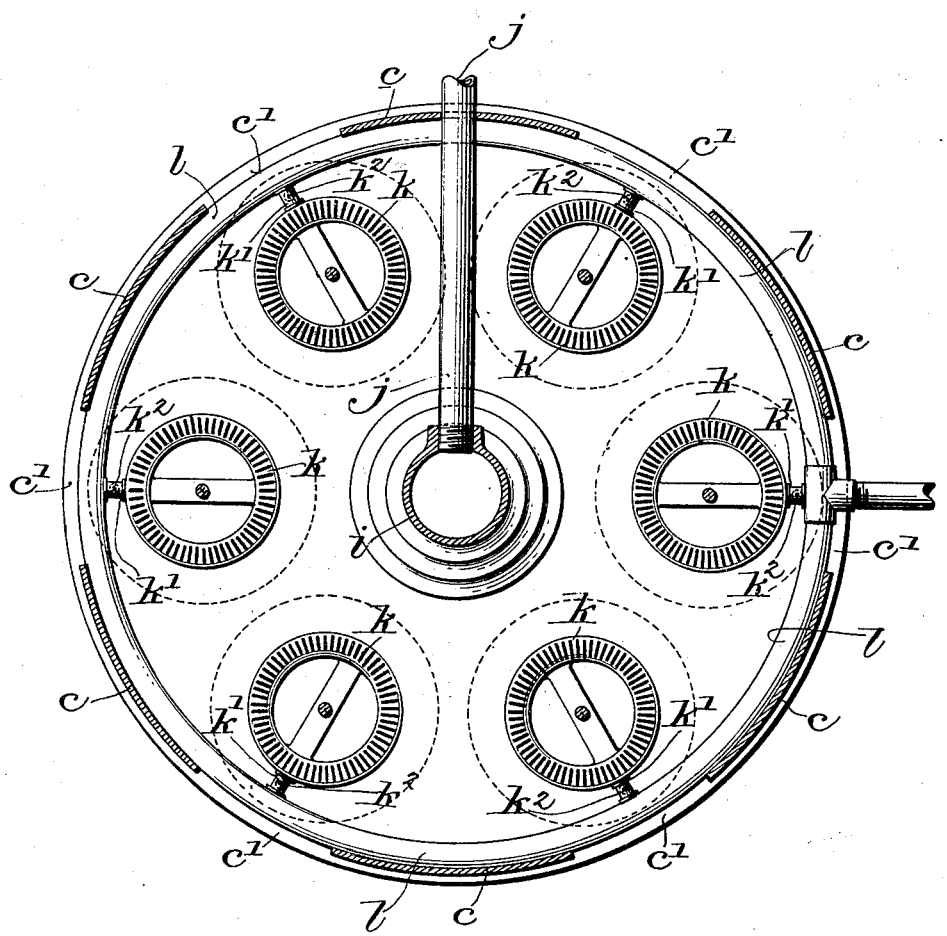

No. 686,900. Patented Nov. 19, 1901.
W. KANE.
STEAM OR HOT WATER GENERATOR.
(Application filed Mar. 18, 1901.)
(No Model.) 2 Sheets—Sheet 1.
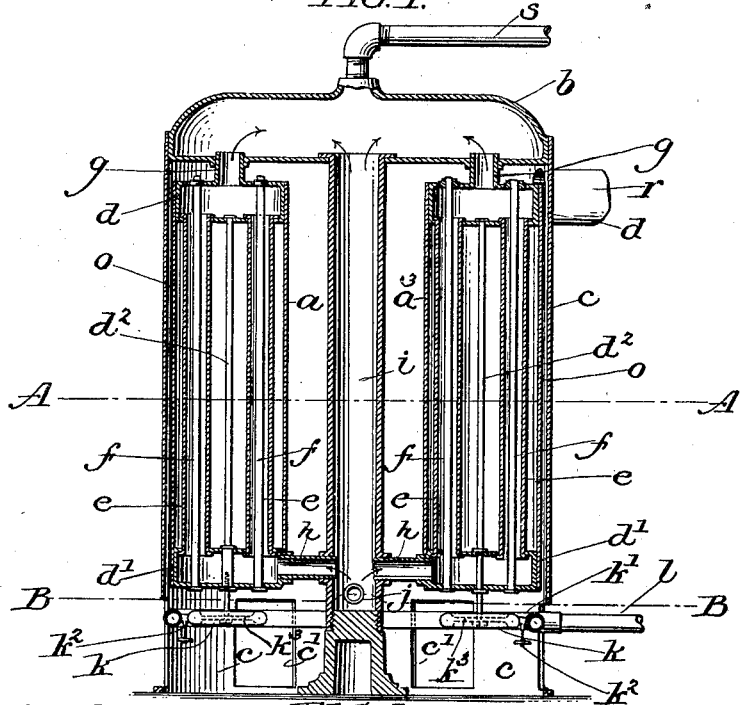
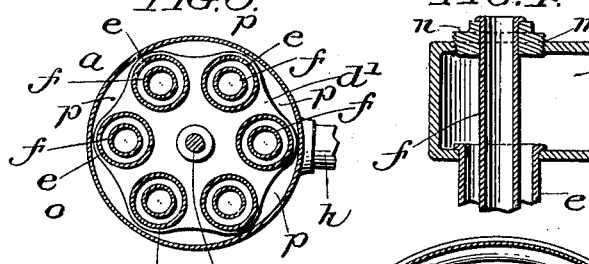
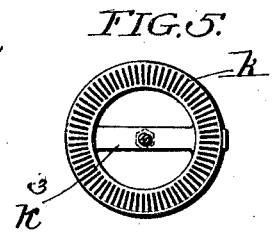
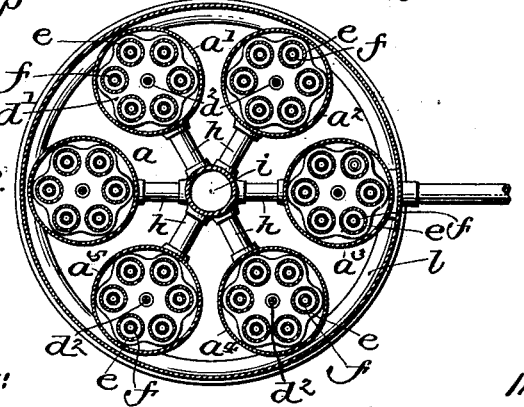
WITNESSES: INVENTOR:
William Kane
THE NORRIS PETERS CO., PHOTO-LITHO., WASHINGTON, D. C.

No. 686,900. Patented Nov. 19, 1901.
W. KANE.
STEAM OR HOT WATER GENERATOR.
(Application filed Mar. 18, 1901.)
(No Model.) 2 Sheets—Sheet 2.

UNITED STATES PATENT OFFICE.

WILLIAM KANE, OF PHILADELPHIA, PENNSYLVANIA.

STEAM OR HOT-WATER GENERATOR.

SPECIFICATION forming part of Letters Patent No. 686,900, dated November 19, 1901.

Application filed March 18, 1901. Serial No. 51,588. (No model.)

*To all whom it may concern:*

Be it known that I, WILLIAM KANE, of the city and county of Philadelphia, in the State of Pennsylvania, have invented an Improvement in Steam or Hot-Water Generators, of which the following is a specification.

My invention relates to steam and hot-water generators; and it consists of the improvements which are fully set forth in the following specification and are shown in the accompanying drawings.

One object of my invention is to provide a generator for generating steam or hot water adapted to raise the temperature of the water quickly and with the expenditure of a moderate amount of gas or fuel.

It is also an object of my invention to enable the generating capacity of the generator to be easily and quickly varied to suit the requirements.

It is also an object of my invention to provide a construction of generator of reasonably large capacity which may be easily and quickly erected or wholly or partially dismantled for purposes of repair.

In carrying out my invention I form the generator of a series of independent vertical generating sections or parts, each of which may be independently provided with heat from gas or fuel, so that all or any number of the sections may be used.

In the preferred embodiment of my invention the generating-sections are formed of a series of vertical water-tubes having heating-flues extending longitudinally through them for conducting the heat. Each section is inclosed in an outer casing adapted to localize the heat from the burner of that section and confine it to the water-tubes thereof. The several sections of the series are connected with and supported by a common dome or chamber and are inclosed by an outer casing.

My invention embraces improvements in the construction of the independent sections and in the manner of connecting the water-tubes and heat-flues to the heads thereof and also embraces various improvements and combinations of parts, which are fully pointed out in the claims.

In the accompanying drawings, Figure 1 is a vertical sectional view of a steam or hot-water generator embodying my invention. Fig. 2 is a horizontal sectional view of the same on the line A A of Fig. 1. Fig. 3 is a similar view, enlarged, of one of the generating-sections. Fig. 4 is a vertical sectional view, enlarged, of a part of one of the generating-sections. Fig. 5 is a plan view of one of the burners, and Fig. 6 is a horizontal sectional view on the line B B of Fig. 1.

The generator consists of a series of vertical generating-sections $a\ a'\ a^2\ a^3$, &c., communicating with a common dome or chamber $b$ at the top and inclosed in an outer casing $c$. Each generating-section is composed of hollow ends $d\ d'$, united by a series of circulating-tubes $e$, through which extend heat-flues $f$, opening at the top and bottom through the hollow ends or heads $d\ d'$. The heads $d\ d'$ are also preferably united by a central tie-rod $d^2$. The upper head $d$ of each generator communicates with the dome or chamber $b$ through a short connecting-tube $g$. The lower heads $d'$ are each connected by a pipe $h$ with the inlet or return.

$i$ is a central support carrying the dome $b$ and having a base or pedestal $i'$, resting upon or secured to the floor. I prefer to make this central support $i$ hollow, in the form of a circulating-tube, as shown, opening at the top into the dome-band, communicating at the bottom with the return-pipe $j$, and with the bases of the generating-sections through the pipes $h$.

The number of generating-sections $a\ a'$, &c., employed and the number of circulating-tubes $e$ in each generating-section are not material to the invention. I have shown six generating-sections arranged in a circle about the central support $i$ and six circulating-tubes $e$ in each generating-section; but these numbers and the arrangement may be varied.

Located below each generating-section is a burner $k$, adapted to supply heat to the flues $f$. These burners preferably consist of annular pipes having a cross-bar $k'$, carrying a screw $k^2$, adapted to be screwed into a threaded socket in the base of the generator, which may be conveniently formed in end of the tie-rod $d^2$ or the tie-rod may be extended in a threaded end and the burner screwed upon it. (See right-hand side of Fig. 1.) In this manner the burners may be easily applied or removed and their positions adjusted. The burners $k$ are connected with the supply-pipe $l$ in any convenient manner. As shown, an annular supply-pipe within the outer casing $c$ is employed, with which the burners are connected by suitable couplings $l'$. Each burner may be controlled by a separate valve $l^2$, and the outer casing $c$ may be provided with openings $c'$ adjacent to the valves to supply air to the burners and to afford access to them for the purpose of lighting them, &c.

The generating-sections $a\ a'$, &c., are preferably constructed as follows: On the inner—i. e., opposing—faces of the heads $d\ d'$ apertures are formed of a proper diameter to receive the circulating-tubes $e$, and in the outer faces concentric with each of these apertures is formed an aperture $m$ of a slightly-larger diameter. The ends of the tubes $e$ are inserted in the inner apertures and are expanded therein, this being permitted through the apertures $m$. Threaded plugs $n$, provided with apertures for the flues $f$, are then screwed into the apertures $m$, the flues $f$ are inserted through the apertures in the plugs, and their ends are expanded therein. This construction is clearly shown in Fig. 4. One end only is shown, as the other is similar.

To thoroughly localize the heat from each burner at the corresponding generating-section, I inclose each generating-section in an outer cylindrical casing $o$, the ends of which encircle the heads $d\ d'$, and by making the peripheries of the heads corrugated, as shown, I provide vertical heat-flues $p\ p$ between the outside of the tubes $e\ e$ and the casing $o$. Thus the heat from the burners is localized at each corresponding generating-section and is conducted not only through the internal flues $f$ within the tubes, but also through the flues or passage-ways $p\ p$ on the outside of the tubes.

The products of combustion may pass off from the interior of the generator through a suitable flue $r$. All or any number of the generating-sections may be used as the condition may require. The water in the heads $d\ d'$ and tubes $e$, heated by the products of combustion from the burners $k$, will circulate through the connections $g$ into the dome $b$, and thence through the pipe $s$ to the system, returning by the pipe $j$ and passing back into the base-heads $d'$ of the generating-sections by the pipes $h$. When the central support $i$ is hollow, as shown, a portion of the water will circulate through this support into the dome $b$, and thence into the pipe $s$.

When the generator is used for steam generation, the steam from the dome $b$ will pass into the pipe $s$ and the water of condensation will return through the pipe $j$.

The details of construction shown may be varied without departing from my invention.

What I claim as new, and desire to secure by Letters Patent, is as follows:

1. In a steam or hot-water generator, the combination of a dome or chamber, a series of independent generating-sections communicating therewith, and each embracing a series of vertically-disposed tubes and a series of vertically-disposed heat-flues extending through said water-tubes, and an independent burner or heating device for each of said generating-sections, whereby heat may be supplied to one or any number of said generating-sections independently of the others.

2. In a steam or hot-water generator, the combination of a dome or chamber, a series of independent vertical tubular generating-sections supported by said dome and communicating therewith, an outer casing inclosing each of said tubular generating-sections, and an outer casing inclosing said series of generating-sections.

3. In a steam or hot-water generator, the combination of a dome or chamber, a series of independent vertical tubular generating-sections supported by said dome and communicating therewith, and an independent burner or heating device for each of said generating-sections, whereby heat may be supplied to one or any number of said generating-sections independently of the others.

4. In a steam or hot-water generator, the combination of a series of independent generating-sections, each embracing a series of vertically-disposed water-tubes and a series of vertically-disposed heat-tubes extending through said water-tubes, a chamber communicating with each of said generating-sections to receive the steam or hot water therefrom, and an independent casing surrounding each of said series of vertically-disposed water-tubes.

5. In a steam or hot-water generator, the combination of a series of independent generating-sections, each embracing a series of vertically-disposed water-tubes and a series of vertically-disposed heat-tubes extending through said water-tubes, a chamber communicating with each of said generating-sections to receive the steam or hot water therefrom, a casing surrounding each of said series of vertically-disposed water-tubes, and an outer casing inclosing said series of independent generating-sections and their casings.

6. In a steam or hot-water generator, the combination of a central support, a dome carried thereby and of substantially larger diameter than said central support and a series of independent vertical tubular generating-sections carried by said dome and communicating therewith about said central support.

7. In a steam or hot-water generator, the combination of a tubular central support, a dome carried thereby and communicating therewith and a series of independent vertical tubular generating-sections carried by said dome and communicating therewith and arranged about said central support and communicating therewith near the base, said dome being arranged above said generating-sections and extending over the tops thereof so as to form the top of the generator.

8. In a steam or hot-water generator, the combination of a tubular central support, a dome carried thereby and communicating therewith, and a series of independent vertical generating-sections carried by said dome and communicating therewith at the top and with the tubular central support at the bottom, said dome being arranged above said generating-sections and extending over the tops thereof so as to form the top of the generator.

9. In a steam or hot-water generator, the combination of a tubular central support, a dome carried thereby and communicating therewith, a series of independent vertical generating-sections carried by said dome and communicating therewith at the top and with the tubular central support at the bottom, and an independent burner or heat-producing device for each of said generating-sections.

10. In a steam or hot-water generator the combination of a dome or chamber, a series of independent vertical generating-sections supported by said dome and communicating therewith at the top, and each provided with vertical heat-flues, and an independent burner for each of said sections located below the base thereof and supported thereby.

11. In a steam or hot-water generator, the independent vertical generating-section consisting of the hollow top and bottom heads $d, d'$, the series of vertical water-tubes $e$ communicating with said heads, and the vertical heat-flues $f$ extending through said tubes $e$, in combination with an annular burner located below the lower ends of said heat-tubes and carried by the lower head $d'$.

12. In a steam or hot-water generator, the independent vertical generating-section consisting of the hollow top and bottom heads $d, d'$, the series of vertical water-tubes $e$ communicating wth said heads, and the vertical heat-flues $f$ extending through said tubes $e$, and an outer casing $o$ inclosing said vertical water-tubes, said heads having a corrugated or irregular periphery so as to form vertical heat-flues $p$ within the casing exterior to the tubes $e$.

13. In a steam or hot-water generator, the independent vertical generating-section consisting of hollow top and bottom heads $d, d'$, a series of vertical water-tubes extending between said heads, and an outer casing $o$ inclosing said tubes, said heads $d$ $d'$ being provided with flue-spaces $p$ $p$ for the passage of heat within the casing exterior to the water-tubes.

In testimony of which invention I have hereunto set my hand.

WILLIAM KANE.

Witnesses:
 WM. CARL,
 WILLIAM J. GEGGIS.